(12) United States Patent
Coomer et al.

(10) Patent No.: US 7,952,042 B2
(45) Date of Patent: May 31, 2011

(54) SEAL APPARATUS FOR CIRCUIT BREAKER APPLICATION

(75) Inventors: Jarrod Lyle Coomer, Weaverville, NC (US); David Aaron Metcalf, Black Mountain, NC (US); Timothy Fair, Boiling Springs, SC (US); Michael Howard Abrahamsen, Greenwood, SC (US); Daniel Edward Hrncir, Fletcher, NC (US); Stanley Ervin Moore, Weaverville, NC (US); Amy Wilcox Rowell, Asheville, NC (US)

(73) Assignee: Eaton Corporation, Cleveland, OH (US)

( * ) Notice: Subject to any disclaimer, the term of this patent is extended or adjusted under 35 U.S.C. 154(b) by 349 days.

(21) Appl. No.: 12/237,501

(22) Filed: Sep. 25, 2008

(65) Prior Publication Data

US 2010/0072039 A1    Mar. 25, 2010

(51) Int. Cl.
*H01H 9/04*    (2006.01)
(52) U.S. Cl. .................. 200/302.1; 200/50.21; 200/293; 361/605
(58) Field of Classification Search ............... 200/302.1, 200/293, 400, 50.21–50.27; 361/605–621; 277/500, 510, 549, 309, 345, 346, 353, 650; 174/539
See application file for complete search history.

(56) References Cited

U.S. PATENT DOCUMENTS

| | | | | | |
|---|---|---|---|---|---|
| 3,621,448 | A | * | 11/1971 | Arnold et al. | 439/272 |
| 4,825,023 | A | * | 4/1989 | Morse | 200/302.2 |
| 5,211,471 | A | * | 5/1993 | Rohrs | 362/206 |
| 6,388,867 | B1 | * | 5/2002 | Rakus et al. | 361/605 |
| 7,558,052 | B1 | * | 7/2009 | Coomer et al. | 361/608 |
| 2009/0173118 | A1 | * | 7/2009 | Schulz et al. | 70/275 |

* cited by examiner

*Primary Examiner* — Michael A Friedhofer
(74) *Attorney, Agent, or Firm* — Martin J. Moran

(57) ABSTRACT

A seal apparatus is disposed between a switchgear cabinet and a circuit breaker between the racked and unracked positions of the circuit breaker. The seal apparatus sealingly extends between the switchgear cabinet and the circuit breaker to resist fluid flow, such as exhaust gases and other matter, between an interior region of the switchgear cabinet and the exterior of the switchgear cabinet.

16 Claims, 6 Drawing Sheets

SEAL APPARATUS FOR CIRCUIT BREAKER APPLICATION

BACKGROUND OF THE INVENTION

1. Field of the Invention

The invention relates generally to circuit breakers and, more particularly, to a seal apparatus that is employable in a circuit breaker application.

2. Description of the Related Art

Circuit breakers are generally well known and are used in numerous applications. For example, circuit breakers can be used to interrupt a circuit under one or more predetermined circumstances, and can be used for other purposes.

Certain types of circuit breakers are mounted in switchgear cabinets during ordinary usage. A typical switchgear cabinet may have a number of electrical conductors which terminate at stabs that are disposed within an interior region of the switchgear cabinet. A switchgear cabinet that is employed with draw-out circuit breaker equipment may also include a slidable cassette within which a circuit breaker is mounted and which enables the circuit breaker to be movably disposed on the switchgear cabinet. Specifically, such a circuit breaker is movable between a racked position wherein a number of finger clusters on the circuit breaker are physically and electrically connected with the stabs, and an unracked position wherein the finger clusters are physically and electrically disconnected from the stabs. While such draw-out switchgear cabinets and circuit breakers have been generally effective for their intended uses, they have not been without limitation.

As a general matter, the line stabs of a switchgear cabinet, i.e., those stabs that would be connected with an electrical utility or other power source, often can be considered to be "live". In most situations, the racking and unracking of a circuit breaker in an OFF condition does not cause electrical arcing between the stabs and the finger clusters. Such electrical arcing can occur, however, in a situation where a fault exists within the circuit breaker, for example, or in other circumstances. Such arcing is undesirable because the explosive energy that is released can be dangerous to an operator and can be destructive of the switchgear equipment. Such an arc may occur during a racking procedure when the stabs and the finger clusters are sufficiently close to one another that an arc can be formed therebetween. During an unracking operation, an arc can occur when the stabs and the finger clusters are physically disconnected but remain sufficiently close that an arc occurs therebetween. Such an arc can remain between the stabs and the finger clusters until they are separated by a sufficient distance to extinguish the arc.

Such circuit breaker faults and other conditions are known to exist, and thus the potential for undesirable arcs within a switchgear cabinet remains. It thus would be desirable to provide an enhanced level of protection from arcing in draw-out circuit breaker equipment.

SUMMARY OF THE INVENTION

These needs and others are met by embodiments of the invention that are directed toward a seal apparatus and a switchgear apparatus that employs the seal apparatus. Such a seal apparatus is advantageously usable with draw-out circuit breaker equipment and potentially can be used in other types of circuit breaker equipment.

In accordance with one aspect of the invention, a seal apparatus is disposed between a switchgear cabinet and a circuit breaker between the racked and unracked positions of the circuit breaker. The seal apparatus sealingly extends between the switchgear cabinet and the circuit breaker to resist fluid flow, such as exhaust gases and other matter, between an interior region of the switchgear cabinet and the exterior of the switchgear cabinet. Such sealing extension of the seal apparatus occurs when a possibility exists of an arc between the stabs of the switchgear cabinet and the finger clusters of the circuit breaker, i.e., when the finger clusters are physically disconnected from the stabs, and it also occurs near the threshold between physical connection and disconnection. The seal apparatus is collapsible and thus is able to remain disposed between the circuit breaker and the switchgear cabinet during travel of the circuit breaker between the racked and unracked positions.

Accordingly, an aspect of the invention is to provide an improved seal apparatus that resists the flow of exhaust gases and other matter between the interior regions of a switchgear cabinet and the exterior thereof during an arcing situation.

Another aspect of the invention is to provide an improved seal apparatus that provides an improved level of protection for an operator and other personnel in an arcing situation during racking and unracking operations.

Another aspect of the invention is to provide an improved seal apparatus that is usable with draw-out circuit breaker equipment.

Another aspect of the invention is to provide an improved seal apparatus that is collapsible and that can remain in a condition sealingly extending between a circuit breaker and a switchgear cabinet during movement of the circuit breaker along a direction of travel.

Another aspect of the invention is to provide an improved seal apparatus that is movable between a collapsed state and a free state, wherein the height of the seal apparatus in its free state is several times its height in the collapsed state.

Another aspect of the invention is to provide an improved seal apparatus structured for use with a switchgear cabinet and a circuit breaker that is movably disposed on the switchgear cabinet. The general nature of the seal apparatus can be generally stated as including a compressible seal body, at least a portion of which is structured to be moved along a direction of travel between a first position and a second position. At least a portion of the seal body in the first position is in a compressed condition and is structured to sealingly extend between at least a portion of the switchgear cabinet and at least a portion of the circuit breaker to resist fluid flow between an interior region of the switchgear cabinet and an exterior region of the switchgear cabinet. At least a portion of the seal body in the second position is disposed between at least a portion of the switchgear cabinet and at least a portion of the circuit breaker and is in at least one of a relaxed condition and a condition relatively less compressed than in the first position. The seal body has an opening formed therein that is structured to movably receive therein at least a portion of the circuit breaker in the first and second positions.

Another aspect of the invention is to provide an improved switchgear apparatus. The general nature of the switchgear apparatus can be stated as including a switchgear cabinet, a circuit breaker disposed on the switchgear cabinet and movable along a direction of travel between an unracked position and a racked position, and a seal apparatus. The seal apparatus comprises a compressible seal body, and at least a portion of the seal body is movable along the direction of travel between a first position and a second position. The seal body is in the first position when the circuit breaker is in the unracked position, and the seal body is in the second position when the circuit breaker is in the racked position. At least a portion of the seal body in the first position is in a compressed condition sealingly extending between at least a portion of the switchgear cabinet and at least a portion of the circuit breaker and is structured to resist fluid flow between an interior region of the switchgear cabinet and an exterior region of the switchgear cabinet. At least a portion of the seal body in the second position is disposed between at least a portion of the switchgear cabinet and at least a portion of the circuit breaker and is in at least one of a relaxed condition and a condition relatively less compressed than in the first position. The seal body has an opening formed therein, at least a portion of the circuit breaker is disposed in the opening in the first and second positions.

BRIEF DESCRIPTION OF THE DRAWINGS

A further understanding of the invention can be gained from the following Description of the Preferred Embodiments when read in conjunction with the accompanying drawings in which.

Similar numerals refer to similar parts throughout the specification.

DESCRIPTION OF THE PREFERRED EMBODIMENTS

Figure 1:
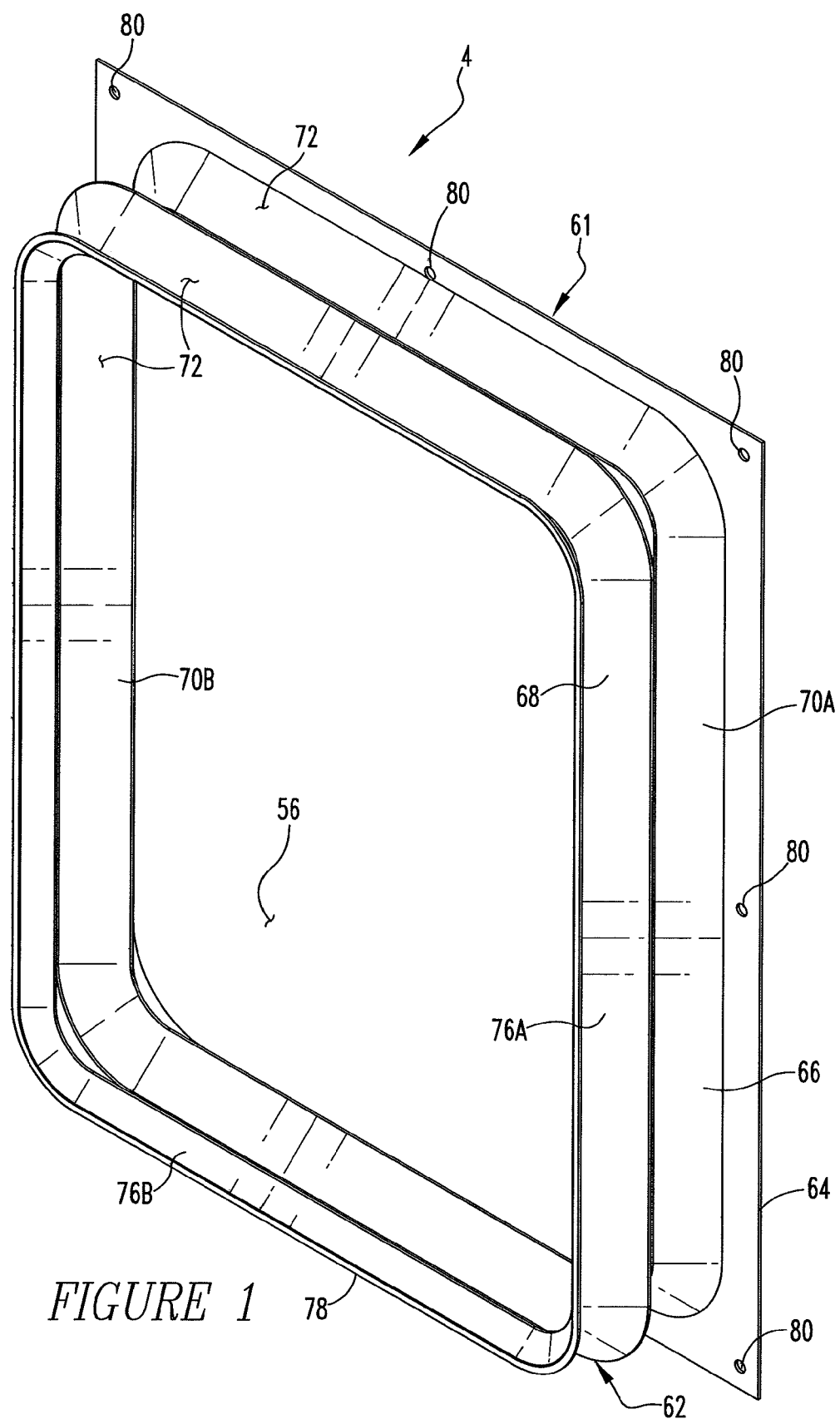
FIG. 1 is a perspective view of an improved seal apparatus in accordance with the invention.
Figure 2:
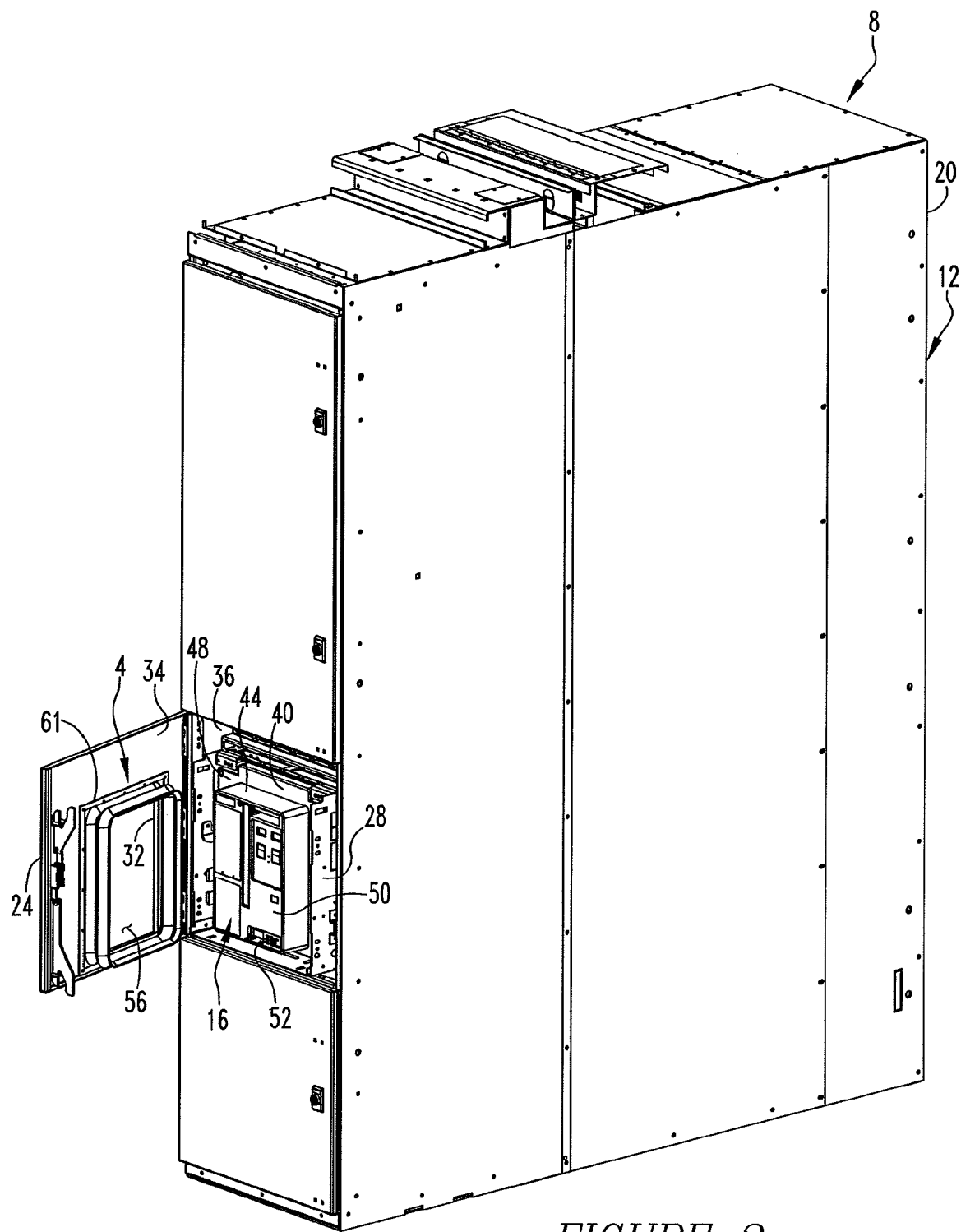
FIG. 2 is a perspective view of a switchgear apparatus in accordance with the invention and that employs the seal apparatus of FIG. 1.
Figure 5:
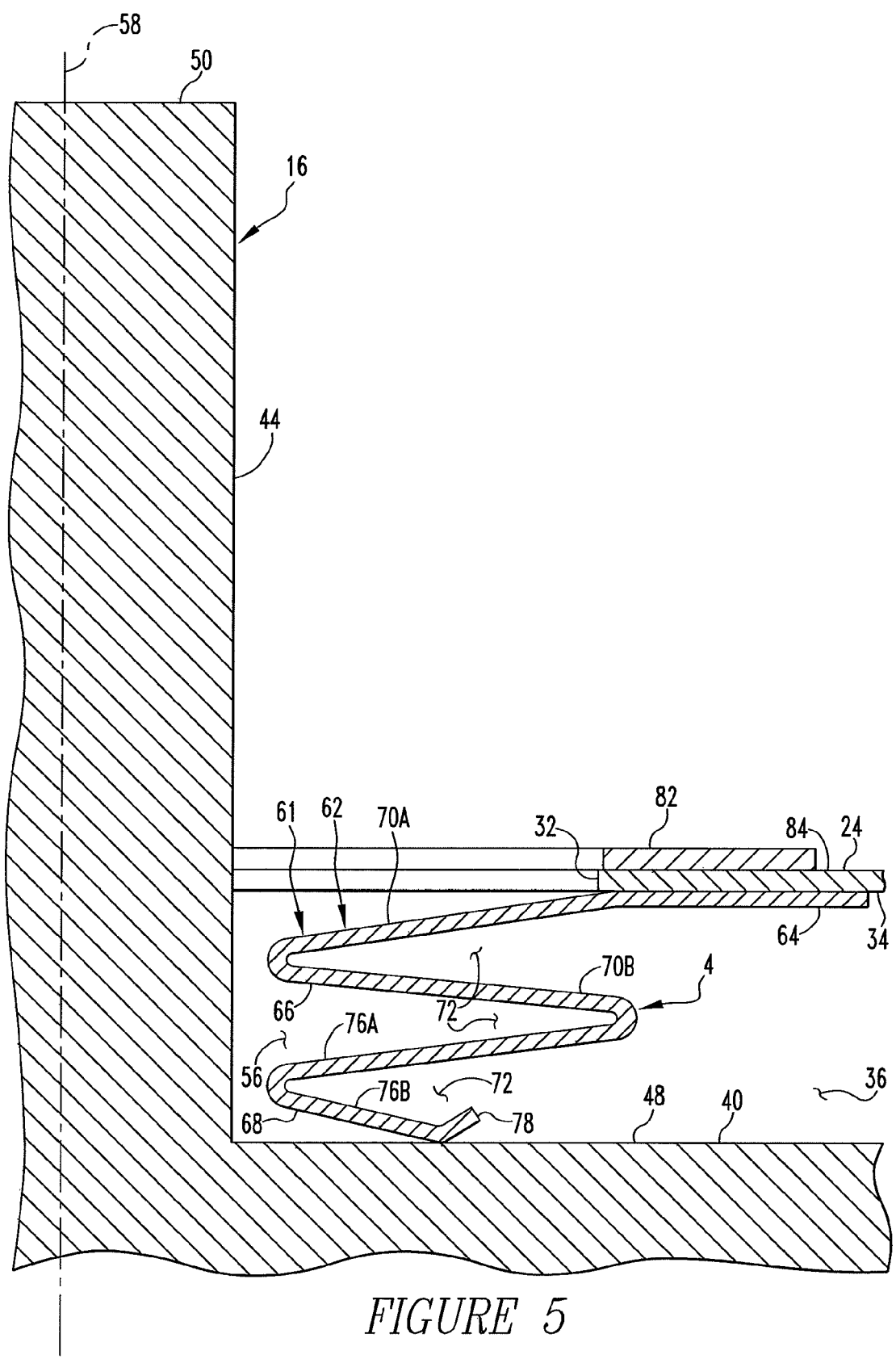
FIG. 5 is a sectional view as taken along line 5-5 of FIG. 3.
Figure 6:
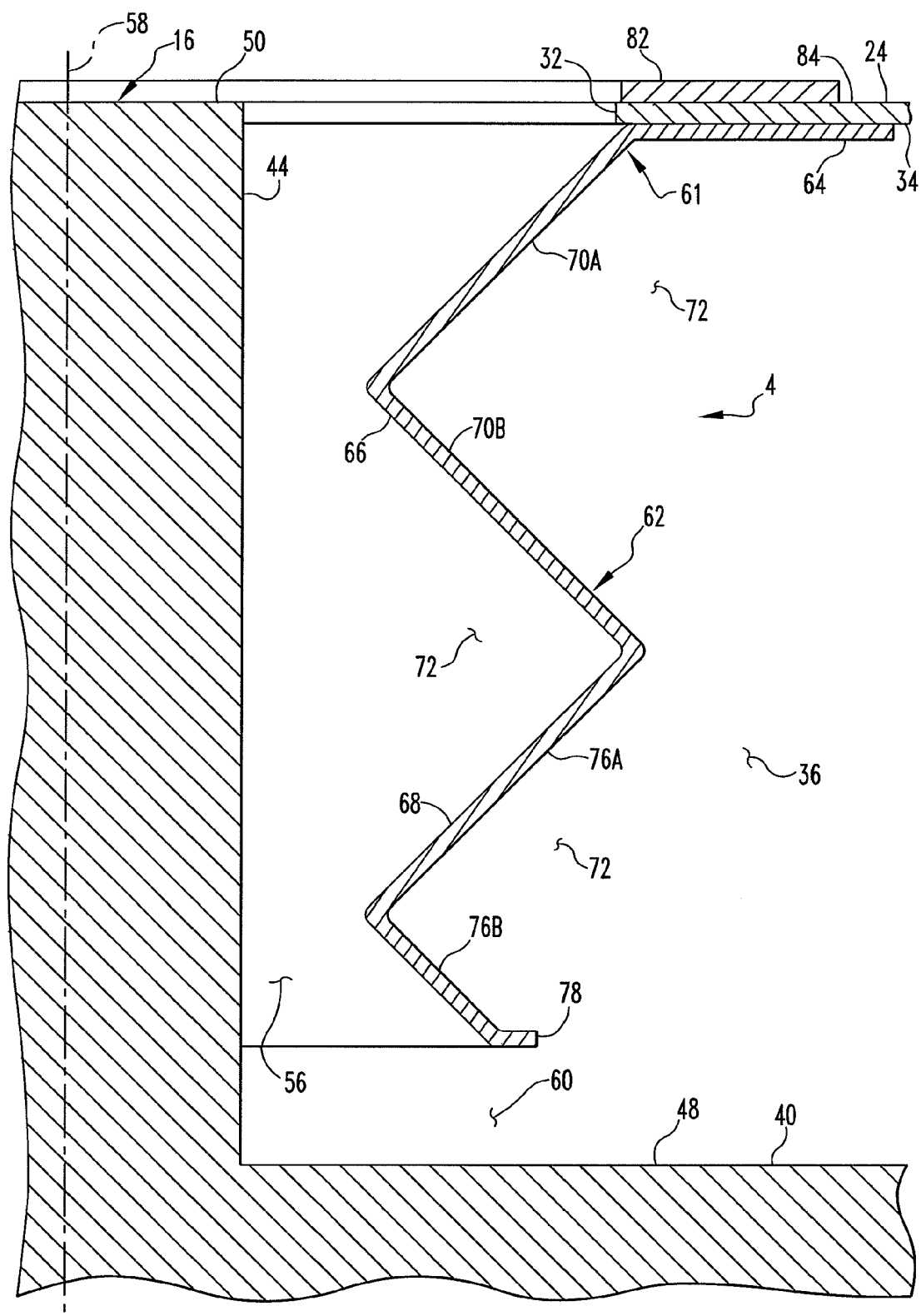
FIG. 6 is a sectional view as taken along line 6-6 of FIG. 4.

An improved seal apparatus 4 in accordance with the invention is depicted in FIGS. 1 and 2 and is depicted in section in FIGS. 5 and 6. The seal apparatus 4 can be advantageously incorporated into an improved switchgear apparatus 8 in accordance with the invention, as is depicted in FIG. 2.

The exemplary switchgear apparatus 8 is in the nature of draw-out circuit breaker equipment and includes a switchgear cabinet 12, a circuit breaker 16, and the seal apparatus 4. The switchgear cabinet 12 can be generally stated as including an enclosure 20 to which is mounted a door 24. The enclosure 20 has left, right, top, bottom, and rear walls connected together. The door 24 is movable between an open position, such as is depicted generally in FIG. 2, and a closed position, such as is depicted generally in FIGS. 3 and 4.

The switchgear cabinet 12 also includes a cassette 28 that is disposed on the enclosure 20. The circuit breaker 16 is mounted on the cassette 28, and the cassette 28 enables the circuit breaker 16 to be movably disposed on the switchgear cabinet 12. More specifically, the cassette 28 enables the circuit breaker 16 to be moved between an unracked position, such as is depicted generally in FIGS. 2 and 3, and a racked position, such as is depicted generally in FIG. 4. As can be understood from FIGS. 3 and 4, the switchgear cabinet 12 is advantageously configured to enable the circuit breaker 16 to be moved between the racked and unracked positions while the door 24 is in the closed position.

As can be further seen from FIG. 2, the door 24 has an opening 32 formed therein. The seal apparatus 4 is mounted to an interior surface 34 of the door 24 and can generally be said to extend about the perimeter of the opening 32. As will be set forth in greater detail below, the seal apparatus 4 advantageously resists the flow of fluids such as exhaust gases and other matter between an interior region 36 of the switchgear cabinet 12 and regions at the exterior thereof. The interior region 36 can generally be said to be those regions disposed within the interior of the enclosure 20. The seal apparatus 4 thus advantageously resist the flow of exhaust gases and other matter, such as might occur with an arc, from the interior region 36 and out of the opening 32 in the door 24 at those times when an arc might be generated between the finger clusters (not shown) of the circuit breaker 16 and the stabs (not shown) of the switchgear cabinet 12.

The circuit breaker 16 can be said to include a body 40 and a nose 44, wherein the nose 44 protrudes from the body 40. Specifically, the body 40 can be said to include a surface 48, and the nose 44 protrudes outwardly away from the surface 48. The nose 44 has an exterior face 50 that faces toward the exterior regions of the switchgear cabinet 12 when the circuit breaker 16 is disposed in the cassette 28. The face 50 has a receptacle 52 formed therein that is structured to receive a tool (not shown) that is used for moving the circuit breaker 16 between its unracked position, such as is depicted generally in FIGS. 2 and 3, and its racked position, such as is depicted generally in FIG. 4.

The seal apparatus 4 has an opening 56 formed therein that is configured to receive at least a portion of the nose 44 of the circuit breaker 16 therein. In the exemplary switchgear apparatus 8 depicted generally in FIG. 2, the opening 56 of the seal apparatus 4 generally coincides with the opening 32 formed in the door 24, although this need not necessarily be the case in order to successfully implement the seal apparatus 4 into the switchgear cabinet 12.

Figure 3:
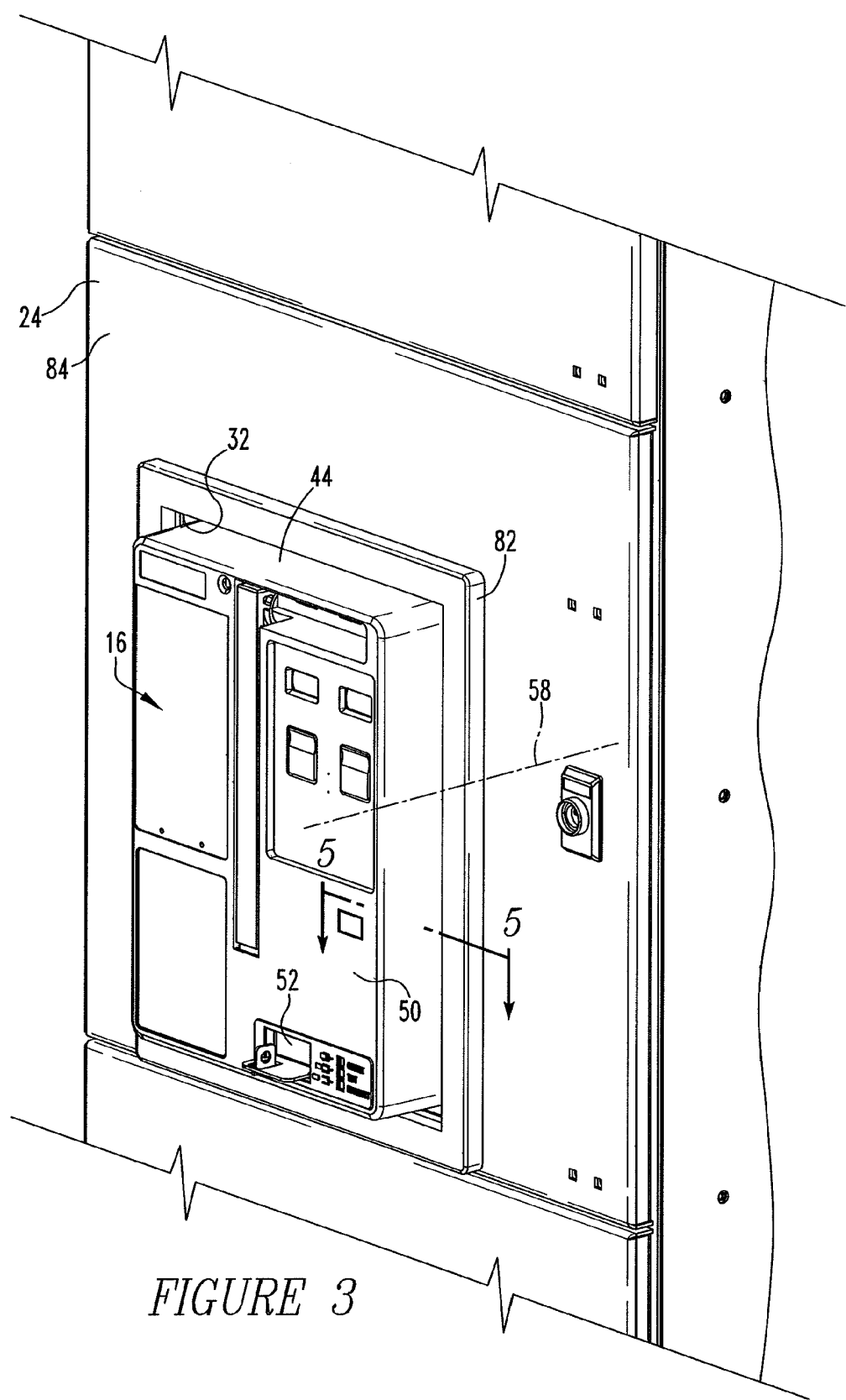
FIG. 3 is another view of the switchgear apparatus of FIG. 2.
Figure 4:
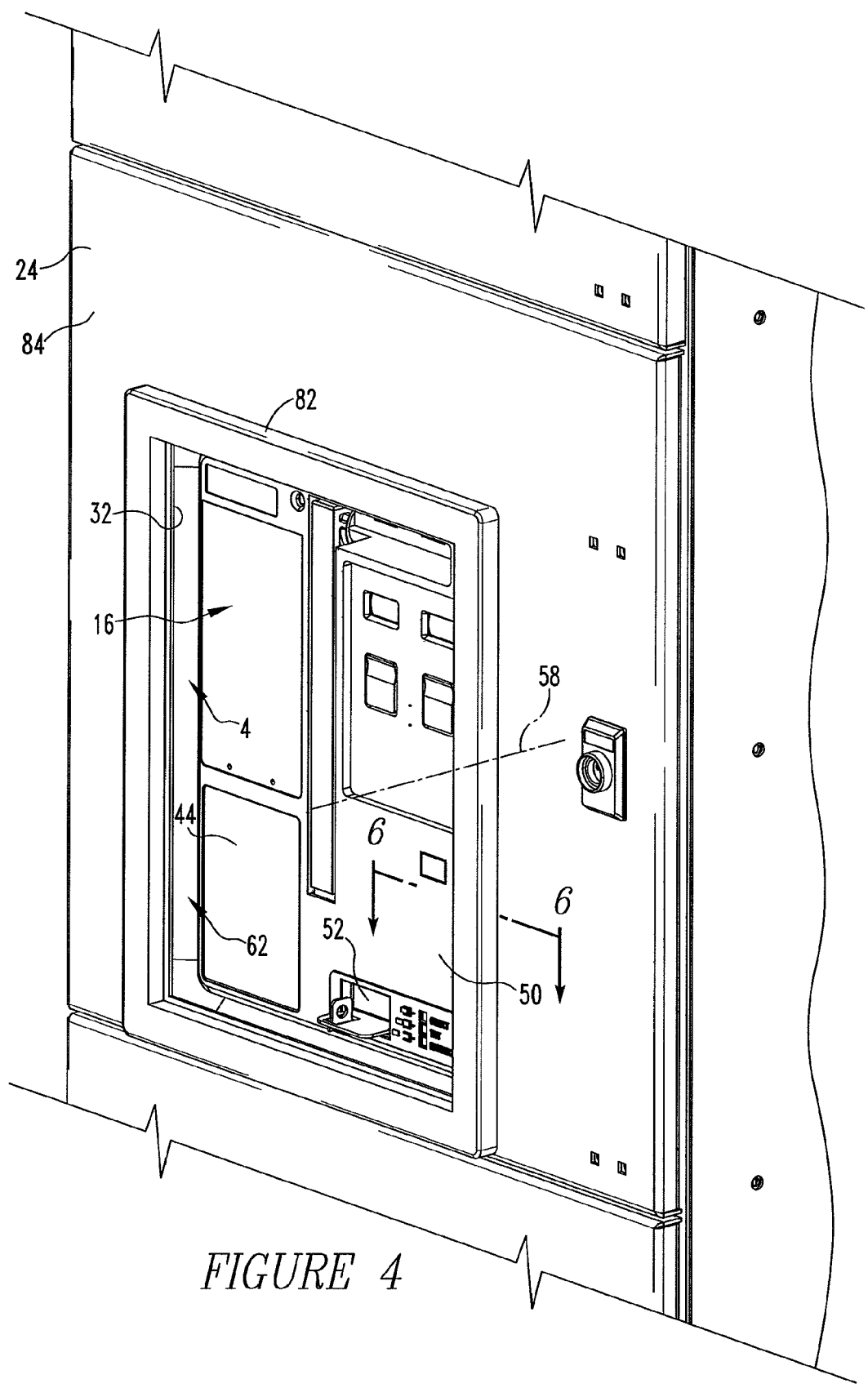
FIG. 4 is a view similar to FIG. 3, except depicting a circuit breaker of the switchgear apparatus being in a racked position.

As can be understood from FIGS. 3-6, the circuit breaker 16 disposed in the cassette 28 is movable along a direction of travel 58 between its unracked position, such as in FIGS. 3 and 5, and its racked position, such as in FIGS. 4 and 6. As can be understood from FIGS. 5 and 6, the seal apparatus 4 sealingly engages the surface 48 of the body 40 of the circuit breaker 16 during at least a portion of the travel of the circuit breaker 16 between the racked and unracked positions. It thus can be seen that at least a portion of the seal apparatus 4 likewise moves with the circuit breaker 16 along the direction of travel 58 between a compressed position, such as is depicted generally in FIG. 5, and a relaxed position, such as is depicted generally in FIG. 6. The depicted exemplary relaxed position of the seal apparatus 4 is a free state of the seal apparatus 4, as can be understood by the exemplary space 60 that exists between the seal apparatus 4 and the surface 48 of the circuit breaker 16. That is, the space 60 indicates that the seal apparatus 4 is disengaged from the surface 48 and is in an uncompressed position. It is noted, however, that the free state of the seal apparatus 4 when the circuit breaker 16 is in the racked position is exemplary only, and in other embodiments the seal apparatus 4 can be configured to be sealingly engaged with the surface 48 of the circuit breaker 16 in the racked position, in which situation the seal apparatus 4 would be in a condition relatively less compressed than when the circuit breaker 16 is in its unracked position.

As can be understood from FIGS. 1, 5, and 6, the seal apparatus 4 is in the form of a seal body 61 can be said to include a seal member 62 and an attachment structure which, in the present example, is in the form of a generally planar flange 64. The seal apparatus 4 is formed of a resilient material such as UL94V0 or other such material that possesses one or more of a number of predetermined characteristics. For instance, the material may desirably be able to withstand normal operating temperatures between 0 and 176 degrees Fahrenheit (−18 to 80 degrees Celsius). The material may desirably be flame retardant and able to withstand a blast on the order of 8 CAL/CM$^2$. The material may desirably be sufficiently resilient to enable it to collapse and to return to its original shape between the configurations that are depicted, for example, in FIGS. 5 and 6.

The seal member 62 in the present exemplary configuration includes a number of corrugations that enable it to collapse while remaining in a condition sealingly extending between the door 24 and the circuit breaker 16 during at least a portion of the travel of the circuit breaker 16 between the racked and unracked positions. As employed herein, the expression "a number of" and variations thereof shall refer broadly to any nonzero quantity including a quantity of one. The exemplary seal member 62 includes a first corrugation 66 and a second corrugation 68, both of which are collapsible at least in part when the circuit breaker 16 moves between the racked and unracked positions. The first corrugation 66 can be said to be a "full" corrugation since it has a pair of legs 70A and 70B that are of equal length, whereas the second corrugation 68 can be said to be a partial corrugation since it has a pair of legs 76A and 76B of unequal length. The shorter leg 76B terminates in a lip 78 that is engageable with the surface 48 of the circuit breaker 16. Nevertheless, the first and second corrugations 66 and 68 can be said to each constitute a corrugation since they form alternating valleys 72 in the seal member 62. It is noted that the exemplary lip 78 can be of other configurations and can be entirely absent from the seal member 62 without departing from the present concept so long as the seal apparatus 4 can be sealingly engaged with the circuit breaker 16 at times when an arc has the potential to exist within the interior region 36 of the switchgear cabinet 12.

In the example depicted in FIGS. 1-2, the flange 64 has a number of holes 80 formed therein that can receive fasteners such as bolts that are connectable with a trim bezel 82 disposed on an exterior surface 84 of the door 24. It is noted, however, that the seal apparatus and, more particularly, the flange 64 in the depicted exemplary embodiment, can be affixed to the door 24 in other fashions. For instance, the flange 64 could be affixed to the exterior surface 84 of the door 24. By way of further example, the flange 64 could be affixed to either of the interior and exterior surfaces 34 and 84 of the door using other attachment methodologies such as with the use of adhesives or in other fashions without limitation. It is also understood that other embodiments of the seal apparatus 4 potentially can be freely disposed on the nose 44 of the circuit breaker 16 without being affixed to either the door 24 or the surface 48. That is, in other embodiments the seal apparatus 48 can be unaffixedly disposed on the nose 44 and can be sealingly engaged with the interior surface 34 of the door 24 and the surface 48 of the circuit breaker 16 when the finger clusters of the circuit breaker 16 are physically disengaged from the stabs of the switchgear cabinet 12 and when they are on the verge of such physical disconnection. For instance, movement of the circuit breaker toward the unracked position can cause the distance between the interior surface 34 of the door 24 and the surface 48 of the circuit breaker 16 to be decreased until the seal apparatus 4 is sealingly interposed between the interior surface 34 and the surface 48. Other installation options can be employed without departing from the present concept.

In the exemplary embodiment depicted in FIGS. 5 and 6, it can be seen that the height of the seal apparatus 4, i.e., its dimension along the direction of travel 58, in the free state of FIG. 6 is several times its height when in the collapsed state of FIG. 5. For instance, the free height of the seal apparatus in FIG. 6 is more than five times its collapsed height in FIG. 5, although differences in height more than or less than five times can be employed without departing from the present concept. The first and second corrugations 66 and 68 advantageously contribute to the ability of the seal apparatus 4 to return to its free state having a height several times its height in its collapsed state.

It thus can be seen that the seal apparatus 4 sealingly extends between the door 24 of the switchgear cabinet 12 and the circuit breaker 16 at all times when an arc potentially can form between the circuit breaker 16 and the switchgear cabinet 12 within the interior region 36 of the switchgear cabinet 12. The space 60 that exists between the seal apparatus 4 and the surface 48 of the circuit breaker 16 in the racked position advantageously facilitates the collapsing, i.e., the compressing, of the seal member 62 to its position in FIG. 5 when the circuit breaker 16 is in its unracked position by eliminating unnecessary material from the seal apparatus 4. That is, at all times between the circuit breaker 16 being in its racked position and being in the position (not expressly depicted herein) at which the lip 78 begins to sealingly engage the surface 48 of the circuit breaker 16, the finger clusters of the circuit breaker 16 are physically engaged with the stabs of the switchgear cabinet 12, and thus no arc has the potential to form therebetween. Since an arc cannot be formed during such travel, the absence of material from the seal apparatus 4 that otherwise would increase the free height thereof and engage the surface 48 in the racked position enables the seal apparatus 4 to be of a relatively smaller size. This facilitates the collapse of the seal apparatus 4 into the relatively small space available between the surface 48 of the circuit breaker 16 and the interior surface 34 of the door 24 when the circuit breaker 16 is in its unracked condition, as is depicted generally in FIG. 5.

The seal apparatus 4 advantageously extends about the circumference of the nose 44 and sealingly extends between the surface 48 of the circuit breaker 16 and the door 24 to resist the flow of gases and other matter from the interior region 36 of the circuit breaker 16 out of the opening 32 formed in the door 24 in the event of an arc. This advantageously protects technicians and other personnel in the vicinity of the switchgear apparatus 8 in the event of an arc.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A seal apparatus structured for use with a switchgear cabinet and a circuit breaker that is movably disposed on the switchgear cabinet, the seal apparatus comprising:
   a compressible seal body, at least a portion of which is structured to be moved along a direction of travel between a first position and a second position;
   at least a portion of the seal body in the first position being in a compressed condition and being structured to sealingly extend between at least a portion of the switchgear cabinet and at least a portion of the circuit breaker to resist fluid flow between an interior region of the switchgear cabinet and an exterior region of the switchgear cabinet;
   at least a portion of the seal body in the second position being disposed between at least a portion of the switchgear cabinet and at least a portion of the circuit breaker and being in at least one of a relaxed condition and a condition relatively less compressed than in the first position; and the seal body having an opening formed therein that is structured to movably receive therein at least a portion of the circuit breaker in the first and second positions.

2. The seal apparatus of claim 1 wherein the seal body comprises a seal member and an attachment structure, the attachment structure being structured to be affixed to one of the switchgear cabinet and the circuit breaker.

3. The seal apparatus of claim 2 wherein the attachment structure is a flange that is oriented transverse to the direction of travel and is structured to be affixed to a movable door of the switchgear cabinet.

4. The seal apparatus of claim 2 wherein the seal member comprises at least a first corrugation that is in a condition at least partially collapsed in the first position.

5. The seal apparatus of claim 1 wherein the seal body in the first position is structured to sealingly engage a surface of the circuit breaker that is oriented transverse to the direction of travel.

6. The seal apparatus of claim 5 wherein the seal body in the first position is structured to be sealingly interposed between the surface of the circuit breaker and a surface of the switchgear cabinet that is oriented transverse to the direction of travel.

7. The seal apparatus of claim 1 wherein the seal body in the first position is structured to be sealingly engaged with at least one of a surface of the circuit breaker that is oriented transverse to the direction of travel and a surface of the switchgear cabinet that is oriented transverse to the direction of travel, the seal body in the second position being in a relaxed condition and being structured to be spaced from the at least one of a surface of the circuit breaker and a surface of the switchgear cabinet.

8. The seal apparatus of claim 1 wherein in the second position the height of the seal apparatus in the direction of travel is a plurality of times the height of the seal apparatus in the direction of travel in the first position.

9. A switchgear apparatus comprising:
a switchgear cabinet;
a circuit breaker disposed on the switchgear cabinet and movable along a direction of travel between an unracked position and a racked position; and
a seal apparatus that comprises a compressible seal body;
at least a portion of the seal body being movable along the direction of travel between a first position and a second position, the seal body being in the first position when the circuit breaker is in the unracked position, the seal body being in the second position when the circuit breaker is in the racked position;
at least a portion of the seal body in the first position being in a compressed condition sealingly extending between at least a portion of the switchgear cabinet and at least a portion of the circuit breaker and being structured to resist fluid flow between an interior region of the switchgear cabinet and an exterior region of the switchgear cabinet;
at least a portion of the seal body in the second position being disposed between at least a portion of the switchgear cabinet and at least a portion of the circuit breaker and being in at least one of a relaxed condition and a condition relatively less compressed than in the first position; and
the seal body having an opening formed therein;
at least a portion of the circuit breaker being disposed in the opening in the first and second positions.

10. The switchgear apparatus of claim 9 wherein the seal body comprises a seal member and an attachment structure, the attachment structure being affixed to one of the switchgear cabinet and the circuit breaker.

11. The switchgear apparatus of claim 10 wherein the switchgear cabinet comprises a door that is movable between an open position and a closed position, the attachment structure being a flange that is affixed to the door and is oriented transverse to the direction of travel when the door is in the closed position.

12. The switchgear apparatus of claim 10 wherein the seal member comprises at least a first corrugation that is in a condition at least partially collapsed in the first position.

13. The switchgear apparatus of claim 9 wherein the circuit breaker comprises a surface that is oriented transverse to the direction of travel, the seal body in the first position being sealingly engaged with the surface of the circuit breaker.

14. The switchgear apparatus of claim 13 wherein the switchgear cabinet comprises a surface that is oriented transverse to the direction of travel, the seal body in the first position being sealingly interposed between the surface of the circuit breaker and the surface of the switchgear cabinet.

15. The switchgear apparatus of claim 9 wherein the circuit breaker comprises a surface that is oriented transverse to the direction of travel and wherein the switchgear cabinet comprises a surface that is oriented transverse to the direction of travel, the seal body in the first position being sealingly engaged with at least one of the surface of the circuit breaker and the surface of the switchgear cabinet, the seal body in the second position being in a relaxed condition and being spaced from the at least one of the surface of the circuit breaker and the surface of the switchgear cabinet.

16. The switchgear apparatus of claim 9 wherein in the second position the height of the seal apparatus in the direction of travel is a plurality of times the height of the seal apparatus in the direction of travel in the first position.

* * * * *